United States Patent
Van Zwol et al.

(10) Patent No.: US 8,527,564 B2
(45) Date of Patent: Sep. 3, 2013

(54) IMAGE OBJECT RETRIEVAL BASED ON AGGREGATION OF VISUAL ANNOTATIONS

(75) Inventors: Roelof Van Zwol, Sunnyvale, CA (US); Ximena Olivares, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 22 days.

(21) Appl. No.: 12/970,844

(22) Filed: Dec. 16, 2010

(65) Prior Publication Data
US 2012/0158716 A1    Jun. 21, 2012

(51) Int. Cl.
G06F 17/00    (2006.01)

(52) U.S. Cl.
USPC ........... 707/953; 707/769; 707/803; 707/722; 707/758; 707/706

(58) Field of Classification Search
USPC .......................... 707/769, 803, 758, 722, 953
See application file for complete search history.

(56) References Cited

U.S. PATENT DOCUMENTS

| | | | |
|---|---|---|---|
| 5,802,361 A | | 9/1998 | Wang et al. |
| 5,915,250 A | * | 6/1999 | Jain et al. ............................. 1/1 |
| 6,714,680 B1 | | 3/2004 | Sasada |
| 7,949,186 B2 | * | 5/2011 | Grauman et al. ............. 382/170 |
| 2002/0131641 A1 | * | 9/2002 | Luo et al. ....................... 382/218 |
| 2003/0195883 A1 | * | 10/2003 | Mojsilovic et al. ................ 707/6 |
| 2006/0020398 A1 | * | 1/2006 | Vernon et al. ................... 702/20 |
| 2006/0143176 A1 | * | 6/2006 | Mojsilovic et al. ................ 707/6 |
| 2008/0091723 A1 | | 4/2008 | Zuckerberg et al. |
| 2008/0177640 A1 | | 7/2008 | Gokturk et al. |
| 2008/0212899 A1 | | 9/2008 | Gokturk et al. |
| 2008/0219596 A1 | | 9/2008 | Shiitani et al. |

FOREIGN PATENT DOCUMENTS

| EP | 1 267 280 A2 | 8/2002 |
|---|---|---|
| KR | 1020050116963 A | 12/2005 |
| WO | WO 2005/096178 A1 | 10/2005 |

OTHER PUBLICATIONS

U.S. Appl. No. 12/258,349, filed Oct. 24, 2008, Notice of Alowance, Correspondence Mailing Date Feb. 11, 2011.
European Patent Office, "Search Report", in application No. 09822581.6—2201, Applicant: Yahoo! Inc., dated Oct. 9, 2012, 7 pages.
Current Claims in application No. 09822581.6—2201, dated Oct. 2012, 3 pages.
Korean Patent Office, "Preliminary Rejection" in application No. 10-2011-7011702 dated Apr. 19, 2013, 2 pages.
Current Claims in application No. 10-2011-7011702 dated Apr. 2013, 5 pages.

* cited by examiner

*Primary Examiner* — Sana Al Hashemi
(74) *Attorney, Agent, or Firm* — Hickman Palermo Truong Becker Bingham Wong LLP

(57) ABSTRACT

An approach for responding to a text-based query for a digital image is provided. A request that identifies one or more keywords is received. A number of annotated digital images are selected based on a previously determined optimum quantity of annotated digital images. Composite data is gathered from each annotated digital image and a set of candidate digital images is selected based on the composite data. The set of candidate images are the digital images, of a set of digital images, which have a visual appearance that is most similar to the composite data. A response is generated that identifies those digital images which are most responsive to the one or more keywords. Alternatively, a partitioned response is generated which identifies dissimilar sets of digital images.

20 Claims, 10 Drawing Sheets

IMAGE OBJECT RETRIEVAL BASED ON AGGREGATION OF VISUAL ANNOTATIONS

CROSS-REFERENCES TO RELATED APPLICATIONS

The present disclosure is related to the following commonly-assigned co-pending U.S. patent application: application Ser. No. 12/258,349, filed Oct. 24, 2008, entitled "Digital Image Retrieval By Aggregating Search Results Based On Visual Annotations."

The disclosure of the foregoing application is incorporated herein by reference for all purposes.

FIELD OF THE INVENTION

Embodiments of the invention generally relate to processing a text-based request for a digital image.

BACKGROUND

There are many situations in which a user may wish to search for a digital image. For example, a user may wish to look for a particular digital picture on the Internet. As another example, a user may wish to retrieve a particular digital image from a set of digital images the user has stored locally on the user's personal computer. As a result, many different types of software applications have a need to support functionality that enables a user to search for digital images.

While several different approaches exist for retrieving digital images, these approaches are not without limitations. One approach for performing a search for a digital image (denoted the "query by keyword" approach) is to search for all digital images in a set of digital images that are associated with a character string that matches one or more search terms (referred to individually as a "keyword") submitted by a requesting user. For example, if a user submits a query having a keyword "dog," and the term "dog" is in the name of a particular digital name, then this approach might suggest that the digital image that has the word "dog" in its name satisfies the query.

A problem with the query by keyword approach is that, for a digital image to satisfy the query, a keyword identified in the query needs to match a character string associated with the digital image. Users are free to assign any name and/or description to a digital image based on any reason. A user may decide to assign a name and/or description to an entire digital image for purposes of describing the visual content of the digital image, but also based on subjective, spatial, temporal and social reasons. For example, the name or description of a digital image may be assigned, either by a human or software entity, based on a timestamp, the name of a folder containing the digital images, or a sequence number indicating the position of the digital image relative to other digital images. This complicates the task of keyword based search, as a particular digital image, which might otherwise satisfy the user's query, might be associated with text that does not match any of the keywords identified by the query.

Another problem with the query by keyword approach is that a series of keywords simply lacks the expressiveness that is inherent in a digital image. In other words, it is difficult for a user to express the visual characteristics of the desired image only using only a few keywords.

Another approach (denoted the "query by image approach") for performing a search for a digital image is to search for all digital images in a set of digital images that are similar to a sample digital image that is submitted by the requesting user. An initial obstacle with the query by image approach is that the requesting user must use a sample digital image to find other images, and in many instances the requesting user simply may not have a sample digital to use as a basis for the search.

Another problem of the query by image approach is that it can be difficult to identify the other digital images that are similar to the sample digital image submitted by the requesting user. This is caused by a phenomenon known as the semantic gap problem. The semantic gap problem characterizes the difference between two descriptions of an object by different linguistic representations. In the query by image approach, high level concepts (such as a flag, an airplane, or a newsreader) are derived from the low level features (such as color of an object, shape of an object, or size of an object) that are extracted from the sample digital image submitted by the requesting user. Thus, if the high level concepts present in the appearance of a digital image are to be identified to understand the meaning of the digital image, the only available independent information is the low-level pixel data for the digital image. However, even the simple linguistic representation of shape or color such as round or yellow requires entirely different mathematical formalization methods. Due to this complexity, it is often difficult to determine which high level features of the user-submitted sample digital image the user is interested in, and it is next to impossible to build specific high level concept detectors for all concepts in the physical world.

Accordingly, a new improvement in the field of digital image search would be desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for improving the performance of retrieving digital images that satisfy a text-based request by aggregating the result sets of query by image searches performed using digital images having visual annotations associated with keywords identified by the request.

When a request is received that identifies one or more keywords, one or more annotated digital images are selected based on the one or more keywords. In an embodiment, the one or more annotated digital images are selected for each having a visual annotation that is associated with at least one of the one or more keywords. In another embodiment, the one or more annotated digital images are selected for each having a visual annotation that exactly matches the keywords identified by the request. Other embodiments may use a variety of different standards for determining when an association between a keyword and a visual annotation is strong enough to include the digital image associated with the visual annotation in the one or more annotated digital images being selected. A visual annotation is a bounded region on a portion of the visual appearance of the digital image which has been assigned an annotation by a user.

For example, a request may be received that identifies the keywords, "British," "phone," and "booth." In response, a number of annotated digital images that have a visual annotation that is associated with "British phone booth" may be identified, e.g., one or more of the digital images shown in FIG. 3 may be identified, as each of the visual annotations shown in FIG. 3 have been assigned an annotation that is associated with "British phone booth." In an embodiment, the number of annotated digital images selected for a particular request may be a predetermined optimum number of annotated digital images, as the particular number of annotated digital images selected by embodiments of the invention may impact both the accuracy and the speed in responding to the request.

BRIEF DESCRIPTION OF THE DRAWINGS

Embodiments of invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Receiving a Request for a Digital Image

Figure 1:
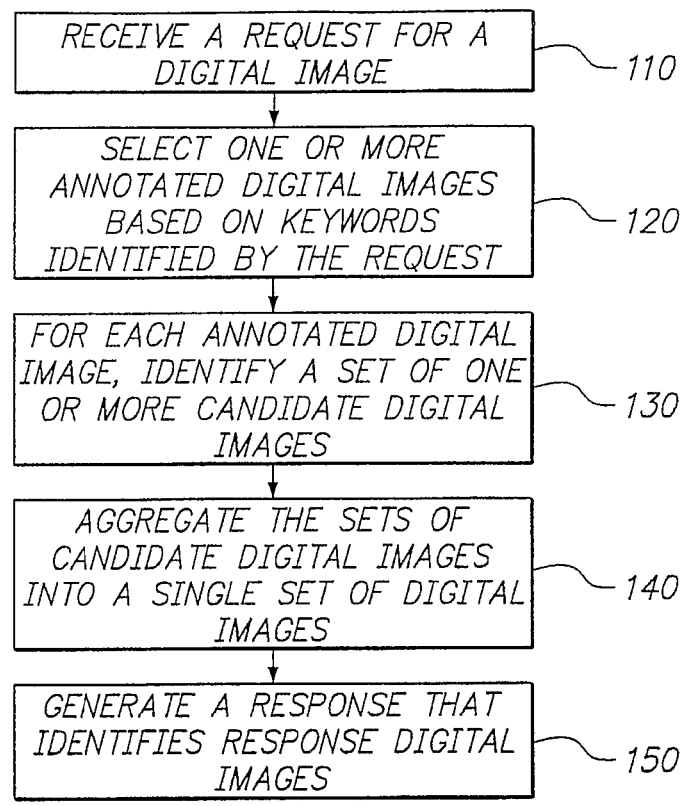
FIG. 1 is a flowchart depicting the high level functional steps of performing a search according to an embodiment of the invention.

Embodiments of the invention shall be described with reference to FIG. 1, which is a flowchart depicting the high level functional steps of performing a search according to an embodiment of the invention. In step 110, a request for a digital image is received. The request of step 110 identifies one or more character strings separated by a delimiting character (such as a space). Each character string identified by the request may be referred to in the art as a "keyword." There is no requirement that a keyword be a recognized word as such, as a character string identified by the request may correspond to any possible string of characters. To illustrate, "beach," "kittens," "T220," and "e$r&u6" are all possible keywords, even though only "beach" and "kittens" are officially recognized words.

The request of step 110 may be received by a variety of different parties in a variety of different contexts. To illustrate the broad range of recipients of the request of step 110, the request of step 110 will be discussed with reference to FIG. 2, which is a block diagram of an exemplary system 200 according to an embodiment of the invention.

In an embodiment, client 210 may issue the request of step 110. Client 210, as broadly used herein, represents any entity capable of issuing a request for one or more digital images. Non-limiting, illustrative examples of client 210 include a web browser and a software application executing on a wireless device or a personal computer.

In an embodiment, server 220 receives the request of step 110. Server 220, as broadly used herein, represents any entity or group of entities which, either individually or collectively, are able to receive and process a request for one or more digital images. Non-limiting, illustrative examples of server 220 include a web server and/or an application server. For example, server 220 may be implemented as a web server which interacts with an application server or other software application to respond to requests from client 210 for digital images. In an embodiment, server 220 retrieves digital images from a set of digital images stored in storage 230 over communications link 242.

Figure 2:
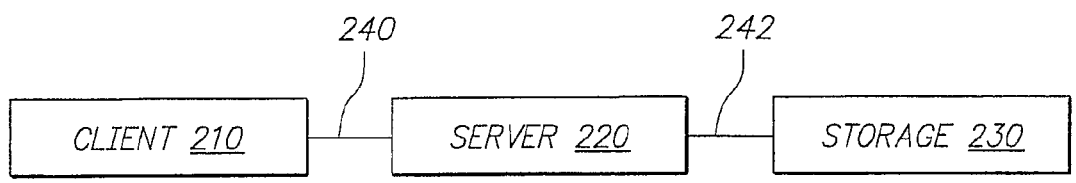
FIG. 2 is a block diagram of an exemplary system according to an embodiment of the invention.

In an embodiment, digital images may be stored on storage 230. Storage 230, as broadly used herein, represents any volatile or non-volatile storage medium which may be used to store digital content. While FIG. 2 depicts storage 230 as a single entity, storage 230 may represent any number of entities capable of storing digital images, e.g., storage 230 may represent two or more volatile or non-volatile storage mediums that are each capable of storing digital images. In an embodiment, storage 230 may be implemented using a database management system (DBMS) or using a file system.

Communications link 240 may be implemented by any medium or mechanism that provides for the exchange of data between client 210 and server 220. Communications link 242 may be implemented by any medium or mechanism that provides for the exchange of data between server 220 and storage 230. Non-limiting, illustrative examples of communications links 240 and 242 include, without limitation, a network such as a Local Area Network (LAN), Wide Area Network (WAN), Ethernet or the Internet, one or more terrestrial, satellite or wireless links, and serial or parallel printer cables. In an embodiment not depicted in FIG. 2 (and explained in more detail below), one or more of client 210, server 220, and storage 230 may correspond to the same entity and/or implemented on the same physical machine, and as such, communications link 240 or 242 may not be included in system 200.

To illustrate several exemplary embodiments of the invention, client 210 may correspond to a web browser, server 220 may correspond to a web server and an application server, storage 230 may correspond to a database management system (DBMS), and communications links 240 and 242 may correspond to a packet based network, such as the Internet. In such an embodiment, step 110 may be performed by the user using a web browser to interact with a web site to send a request for one or more digital images to a web server. The web server, in turn, may interact with an application server or other software application in servicing the request. The application server determines which digital images to retrieve from a database management system using the techniques discussed herein, and subsequently retrieves those digital images from the database management system. The application server provides the retrieved digital images to the web server, and the web server provides a responsive web page, which includes those digital images, to the web browser.

In another embodiment, client 210 may correspond to a software application executing on a wireless device, such as a cell phone, laptop, or personal digital assistant (PDA) and communications link 240 may correspond to a wireless network. Client 210 may send the request of step 110 to server 220 over a wireless network. Server 220 determines which digital images to retrieve from a database management system using the techniques discussed herein, and subsequently retrieves those digital images from the database management system, and sends the digital image to the wireless device for display thereon.

Two or more of the entities depicted in FIG. 2 may be implemented on the same physical machine. For example, in an embodiment not depicted in FIG. 2, client 210 and server 220 may be the same entity. In such an embodiment, a user may issue a request for digital images in step 110 using a particular software application, and that same software application may performs the functions discussed above with respect to server 220. For example, a user may use a software application executing on the user's personal computer to retrieve digital images stored on the user's personal computer. In such an embodiment, storage 230 may be implemented using the user's personal computer's file system. A user may wish to use such an embodiment to manage digital images stored locally on the user's personal computer using a software application that executes exclusively on the user's personal computer. Thus, the functions performed by client 110, server 220, and storage 230 may be performed on a variety of different machines, and the particular embodiment depicted in FIG. 2 is merely illustrative of one embodiment of the invention.

After the request of step 110 is received, one or more annotated digital images are selected, as shall be explained in further detail below.

Selecting Annotated Digital Images

In step 120, a set of one or more annotated digital images (or "sample images") is selected. In an embodiment, the set of one or more annotated digital images is selected by server 220. As shall be explained in more detail in the next section, each of the one or more annotated digital images identified in step 120 will be used in step 130 to search for additional digital images (denoted candidate digital images) that may satisfy the request of step 110 using a query by image search. Therefore, the one or more annotated digital images selected in step 120 should be those digital images chosen from a collection of digital images whose visual appearance is most relevant to the keywords identified by the request of step 110.

Prior to describing how the set of one or more annotated digital images are selected in step 120, a brief description of what an annotated digital is and how it can be created will be presented. Each of the one or more annotated digital images selected in step 120 has a bounded region associated therewith. Additionally, each bounded region has been associated with an annotation. The bounded region associated with each annotated digital image identifies a portion of the appearance of the annotated digital image. A human, such as the photographer who took the digital picture, may determine the size, shape, and position of the bounded region on the appearance of a digital image as well as assign an annotation to the bounded region. Typically, a human will assign an annotation to a bounded region that describes the content displayed in the bounded region of the annotated digital image.

Photo sharing and management applications and services, such as the online photo sharing service Flickr provided by Yahoo! Inc. of Sunnyvale, Calif. and the online photo sharing service Picasa provided by Google Inc. of Mountain View, Calif., enable users to view and manager their digital images as well as share them with others. Certain photo sharing and management applications and services, such as Flickr, enable a user to identify a bounded region on the appearance of a digital image and to make an annotation to the bounded region to produce an annotated digital image.

Figure 3:
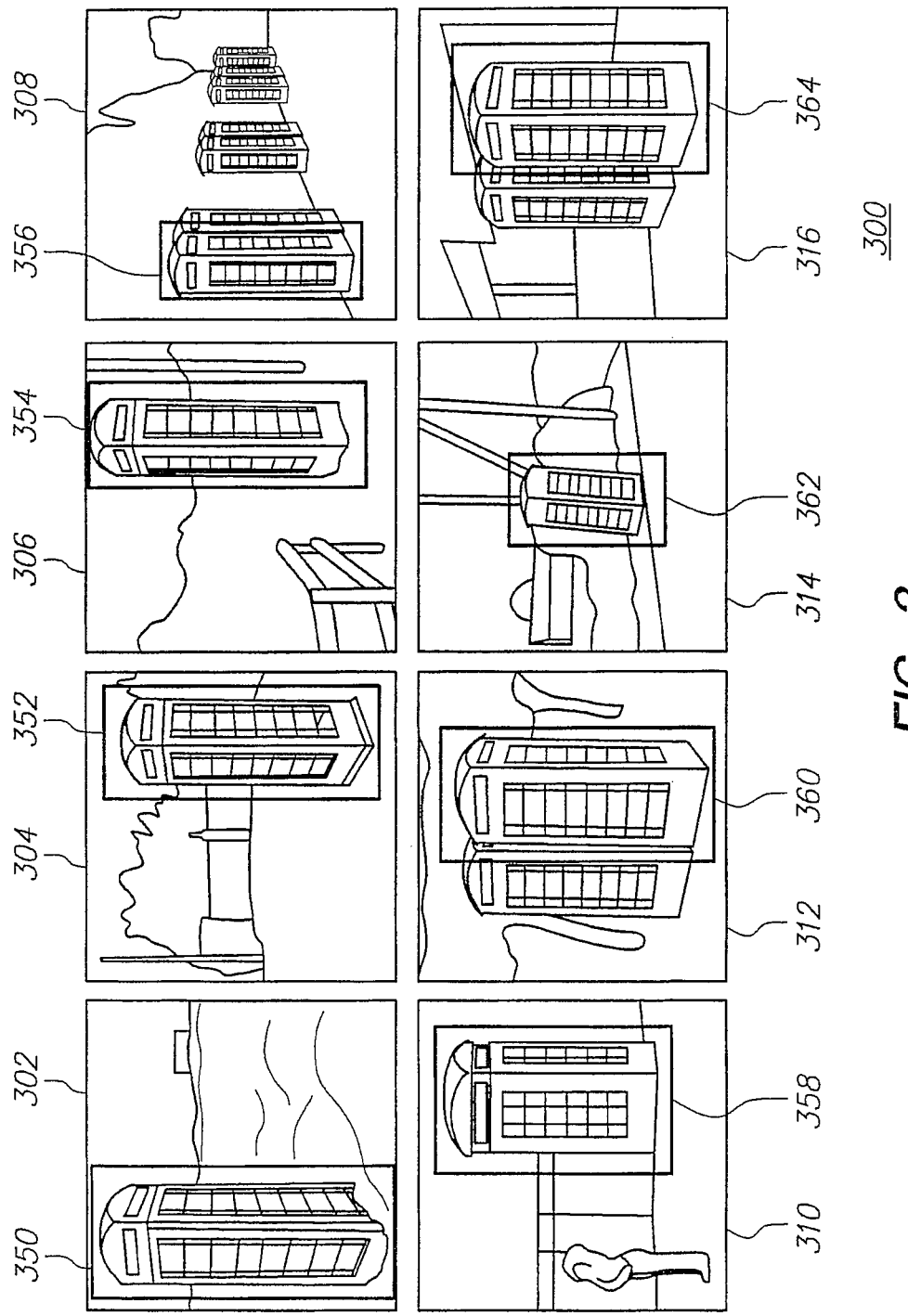
FIG. 3 is an illustration depicting eight different annotated digital images according to an embodiment of the invention.

To illustrate how an annotated digital image may be made, FIG. 3 is an illustration 300 depicting eight different annotated digital images according to an embodiment of the invention. Annotated digital images 302, 304, 306, 308, 310, 312, 314, and 316 are depicted in illustration 300. Each of the eight digital images shown in FIG. 3 has a bounded region associated therewith, namely bounded regions 350, 352, 354, 356, 358, 360, 362, and 364. Each of bounded regions 350, 352, 354, 356, 358, 360, 362, and 364 encloses visual content that depicts a British telephone booth. Each of bounded regions 350, 352, 354, 356, 358, 360, 362, and 364 is also associated with the annotation "British telephone booth."

A user may take a digital picture using a digital camera. For this explanation, assume the user created digital image 302 with their digital camera. The user may upload digital image 302 to a photo sharing and management application or service, such as Flickr. The user may use the "Notes" feature of Flickr to assign bounded region 350 to digital image 302. Since bounded region 350 enclosed visual content that depicts a British telephone booth, the user may assign an annotation to bounded region 350 of "British telephone booth" using the notes feature of Flickr. In a similar fashion, the user may assign a bounded region to any of the digital images depicted in FIG. 3 and subsequently annotate the bounded region.

Since a user determines the boundaries of the bounded region on the appearance of the digital image, the user has complete control over the visual content that is circumscribed by the bounded region. As a result, the user typically annotates the bounded region with a textual description of the content displayed within a bounded region. In this way, annotations provide a very good source of information, as the annotations generally provide a textual description of the visual content identified by the bounded region associated with the annotation.

The popularity of recent on-line photo sharing services has produced very large, continuously growing, online collection of human-annotated digital images. Millions of digital images are uploaded and annotated on a daily basis. These annotated digital images created by users may be used by embodiments of the invention. Accordingly, in an embodiment, storage 230 stores or references digital images that have been uploaded and annotated by a human using a photo sharing and management applications and service, such as Flickr.

In an embodiment, in step 120, the set of one or more annotated digital images are selected by server 220 because each annotated digital image in the set has a bounded region with an annotation that is associated with at least one keyword identified by the request of step 110. In an embodiment, in step 120, server 220 may select each of the one or more annotated digital images from a collection of digital, e.g., those images stored on storage 230 or otherwise accessible to server 220.

Embodiments of the invention may employ different standards for selecting annotated digital images in step 120. For example, according to one embodiment of the invention, server 220 identifies an annotated digital image in step 120 if the annotated digital image has an annotation that exactly matches all the keywords identified by the request of step 110. For example, if the request of step 110 identified the keywords "British," "telephone," and "booth," then any of the annotated digital images shown in FIG. 3 may be identified in step 120, as each annotated digital image shown in FIG. 3 has an annotation (namely "British telephone booth") that exactly matches all keywords identified by the request of step 110.

In another embodiment, server 220 selects an annotated digital image in step 120 if the annotated digital image has an annotation that contains at least one of the keywords identified by the request of step 110. For example, if the request of step 110 identified the keywords "red" and "telephone," then any of the annotated digital images shown in FIG. 3 may be selected in step 120, as each annotated digital image shown in FIG. 3 has an annotation (namely "British telephone booth") that has at least one of the keywords (namely "telephone") identified by the request of step 110.

In another embodiment, server 220 selects an annotated digital image in step 120 if the annotated digital image has an annotation that maps to at least one of the keywords identified by the request of step 110. In such an embodiment, server 220 may store mapping information that maps keywords to terms or words which may be present in an annotation of an annotated digital image. Thereafter, server 220 may use the mapping information in identifying annotated digital images in step 120. For example, the mapping information may be based on synonyms, words that have a similar meaning, and/or genus/species relationships.

In embodiments of the invention, server 220 may employ a variety of different standards in identifying annotated digital images, in descending order of accuracy, until a predetermined number of annotated digital images are selected. For example, if server 220 has been configured to identify four different annotated digital images in step 120, then server 220 may initially employ a strict, but accurate approach for identifying annotated digital images. If the strict, but accurate approach yields only one acceptable annotated digital image for identification in step 120, then server 220 may employ a less strict, but less accurate approach for identifying annotated digital images until the predetermined number of annotated digital images has been identified in step 120.

In an embodiment, the predetermined number of annotated digital images identified by server 220 in step 120 may either be a configurable number or it may be a number that is established by server 220 prior to the receipt of the request by server 220 in step 110. If the predetermined number of annotated digital images is configurable, then upon server 220 receiving input from a user that identifies a number of annotated digital images to identify in step 120, server 220 configures the number of annotated digital images identified in step 120 to reflect the number received from the user.

Retrieving Candidate Digital Images for Each Annotated Digital Image

In step 130, for each annotated digital image identified in step 120, a set of one or more digital images (denoted "candidate digital images") are selected for retrieval from a set of digital images (denoted the set of available digital images). In an embodiment, server 220 selects for retrieval a set of one or more candidate digital images for each annotated digital image selected in step 120. Each candidate digital image, in a set of one or more candidate digital images, has a visual appearance that is most similar to the annotated digital image to which the set of candidate digital images is associated when compared to other digital images in the set of available digital images. Embodiments of the invention may use different approaches for judging similarity between a particular annotated digital image and potential candidate digital images. In one embodiment, each candidate digital image, in the set of one or more candidate digital images, has a visual appearance that is most similar to the entire annotated digital image to which the set of candidate digital images is associated when compared to other digital images in the set of available digital images. In another embodiment, which shall be discussed in further detail below, each candidate digital image, in the set of one or more candidate digital images, has a visual appearance that is most similar to the bounded region associated with each annotated digital image to which the set of candidate digital images is associated when compared to other digital images in the set of available digital images.

Figure 4:
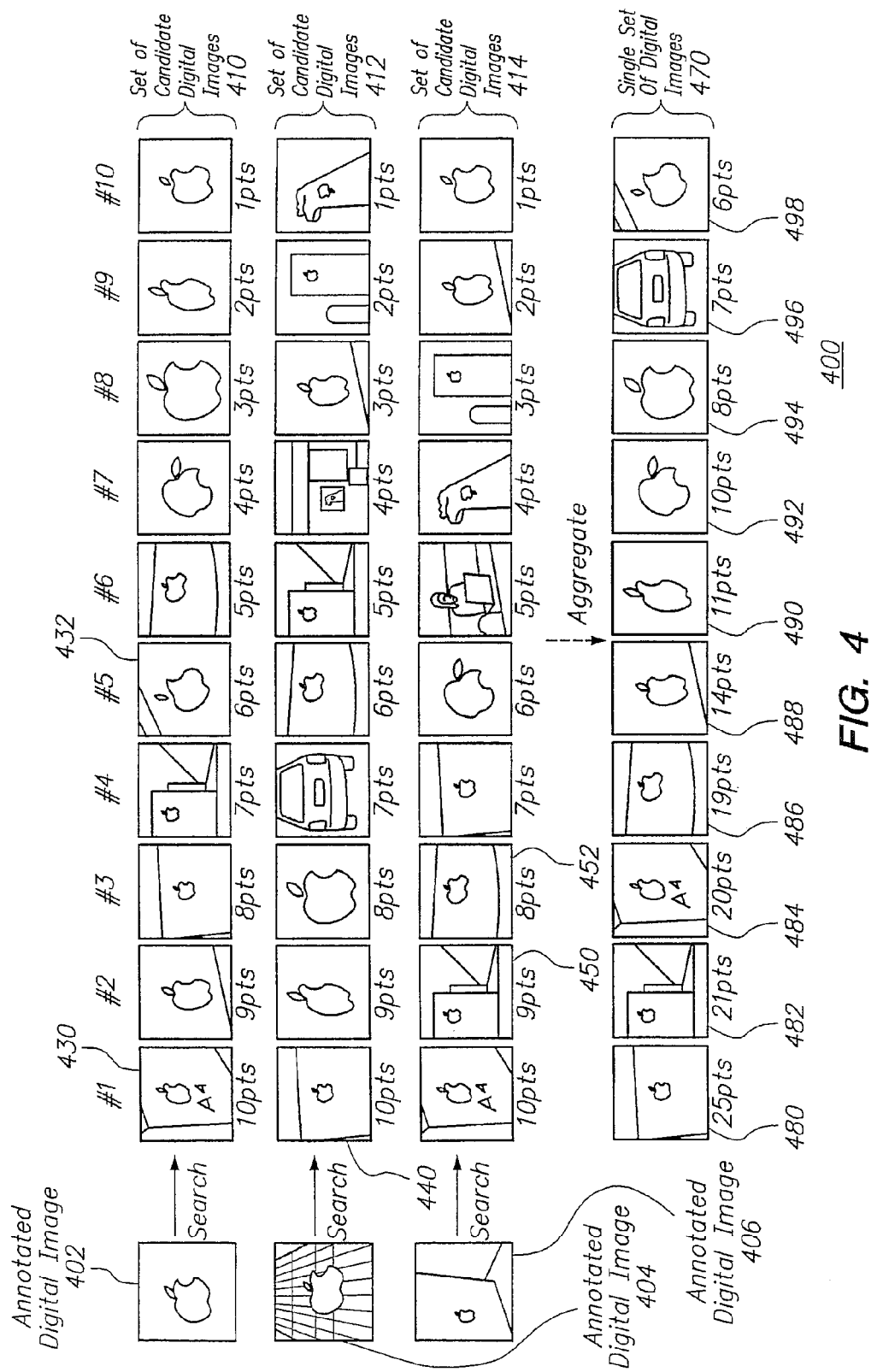
FIG. 4 is an illustration depicting the identification of candidate digital images and the aggregation of search results according to an embodiment of the invention.

FIG. 4 is an illustration 400 depicting the identification of candidate digital images and the aggregation of search results according to an embodiment of the invention. In the embodiment depicted in FIG. 4, assume that three annotated digital images were selected in step 120, and further assume that those annotated digital images are annotated digital images 402, 404, and 406 as shown in FIG. 4. Further assume that annotated digital images 402, 404, 406 were selected in step 120 because a request was received in step 110 that identified the keywords "apple" and "logo." FIG. 4 also depicts three sets of candidate digital images, namely sets of candidate digital images 410, 412, and 414, which are associated with annotated digital images 402, 404, and 406 respectively.

In an embodiment, server 220 uses each annotated digital image selected in step 120 as the basis for performing a query by image search. The results of the query by image search performed using a particular selected annotated digital image become the set of candidate of digital images selected for that particular selected annotated digital image in step 130. For example, in step 130, server 220 may perform a query by image search using annotated digital image 402. The results of that query by image search for annotated digital image 402 become the set of candidate digital images 410. Since the set of candidate digital images for a particular annotated digital image are selected using a query by image search using the particular annotated digital image, candidate digital images in the set of candidate digital images for the particular annotated digital image have a visual appearance that is more similar to the particular annotated digital image when compared to other digital images.

In another embodiment, server 220 uses only the visual content identified by a bounded region associated with an annotated digital image when performing a query by image search to identify the set of candidate digital images associated with the annotated digital image. Such an approach is advantageous, as only performing the query by image search using the visual content identified by the bounded region on an annotated digital image removes noise that may otherwise be present. For example, assume that a particular annotated digital image is of a Chevy Impala that is parked in the middle of a jungle. Assume that the subject matter of interest is the Chevy Impala, and as such, the portion of the visual appearance of the annotated digital image corresponding to the Chevy Impala has been identified by a visual annotation. In this embodiment, only the visual content enclosed by the visual annotation (i.e., the Chevy Impala) will be used to search for candidate digital images for the annotated digital images using a query by image search. In this way, the visual appearance of the portion of the annotated digital image that does not correspond to the area of interest to the user (i.e., the jungle) will not be used in the query by image search used to retrieve the set of candidate digital images for the annotated digital image, thereby increasing the likelihood that digital images in the set of candidate digital images will be similar in visual appearance to the associated annotated digital image.

In an embodiment, server 220 may use one or more filters to limit the search space when selecting one or more candidate digital images in step 130. For example, server 220 may exclude certain digital images that lack certain features from consideration of being selected in step 130.

In an embodiment, the visual similarity between the region described by an annotated digital image and the other digital images may be considered when selecting the set of candidate digital images for the particular annotated digital image. A possible approach is to use the cosine similarity between visual feature vectors to determine the image similarity.

In an embodiment, each set of candidate digital images retrieved in step 130 may be a ranked list. In an embodiment, server 220 may rank candidate digital images in a set of candidate digital images selected in step 130. A variety of different techniques for ranking the digital images within a set of candidate digital images may be employed by server 220; however, the motivation for doing so remains the same, namely to order digital images within a set of candidate digital images in order of descending order of similarity to the visual appearance of the annotated digital image associated with the set of candidate digital images. For example, sets of candidate digital images 410, 420, and 430 are depicted on FIG. 4 as having a rank. Candidate digital images in position 1 are in the top position, and are deemed to be the most similar in appearance to the annotated digital image to which it is associated. To illustrate, candidate digital image 430 is in position 1, and therefore is deemed to have a more similar appearance to annotated digital image 402 than candidate digital image 432. As another example, candidate digital image 442 is in position 7, and therefore is deemed to have a less similar appearance to annotated digital image 404 than candidate digital image 440. As another example, candidate digital image 450 is in position 2, and therefore is deemed to have a more similar appearance to annotated digital image 406 than candidate digital image 452.

In an embodiment, server 220 may limit the number of digital images included within a particular set of candidate digital images retrieved in step 130. For example, server 220 may determine that only X (where X is a positive integer) number of digital images are to be in a particular set of candidate digital images. Further, server 220 may determine that only the highest ranked digital images for a particular set of candidate digital images qualify for inclusion within the set of candidate digital images in step 130. In this manner, server 220 may ensure that the set of candidate digital images for a particular annotated digital image are the most relevant in appearance.

In an embodiment, in step 130, after each set of the one or more sets of candidate digital images is retrieved for each of the annotated digital image selected in step 120, a filter on the one or more keywords identified by the request of step 110 is used. This permits to narrow the candidate set of images to be narrowed to a set more related to the textual query.

The set of available digital images may include any digital images accessible to server 220. For example, the set of available digital images may be stored on storage 230 or other locations accessible to server 220 not depicted in FIG. 2. In an embodiment, the set of available digital images may include one or more repositories of digital images accessible over the Internet, such as the digital images maintained by a photo sharing and management application or service, such as Flickr.

After a set of one or more candidate digital images is selected for each annotated digital image selected in step 120, each set of one or more candidate digital images is aggregated into a single set of digital images, as shall be explained in more detail below.

Aggregating the Sets of Candidate Digital Images into a Single Set of Digital Images In step 140, each set of candidate digital images retrieved in step 130 is aggregated into a single set of digital images. In an embodiment, server 220 may aggregate each set of candidate digital images identified in step 130 into a single set of digital images.

Different approaches for aggregating each set of candidate digital images into a single set of digital images may be employed. Any type of aggregation algorithm may be used in step 140 to aggregate each set of candidate digital images into a single set of digital images. In one approach, rank aggregation may be used. Rank aggregation is a technique that is used by many meta-search engines, where the results from different search engines are merged into a new ranked list of results.

In an embodiment, the particular rank aggregation technique employed in step 140 is the Borda count technique. In the Borda count technique, voters rank candidates in order of preference. The Borda count technique determines the winner of an election by giving each candidate a certain number of points corresponding to the position in which that candidate is ranked by each voter. Once all votes have been counted the candidate with the most points is the winner.

Aggregated ranking favors digital images that are ranked high in multiple sets of candidate digital images. Candidate digital images that are only present in one set of candidate digital image will likely be demoted in the aggregated ranking. This is advantageous because even though a particular candidate digital image may have a similar appearance to one of the annotated digital images selected in step 120, the particular candidate digital image may not match the broad concept being expressed by the keyword in the request of step 110. As a result, that particular candidate digital image may not match the other annotated digital images selected in step 120, and consequently, that particular candidate digital image is assigned a low ranking in the aggregate ranking.

To illustrate how the Borda count technique may be employed in system 200, consider FIG. 4, which is an illustration 400 depicting the identification of candidate digital image and the aggregation of search results according to an embodiment of the invention. As shown in FIG. 4, annotated digital images 402, 404, and 406 are depicted, along with their respective sets of candidate digital images, namely sets of candidate digital images 410, 412, and 414. Every candidate digital image in a set of candidate digital images has been assigned a point total according to their position in the set of candidate digital images. The single set of digital images 470 corresponds to the results of aggregating sets of candidate digital images 410, 412, and 414 into a single set of candidate digital images. Single set of digital images 470 may be ranked, e.g., as depicted in FIG. 4, single set of digital images is ranked in descending order of points.

Identifying Dissimilar Annotated Digital Images

In step 120, one or more annotated digital images for the request of step 110 are selected. In an embodiment, one or more of these annotated digital images may be removed from consideration if the annotated digital image is later determined to be too dissimilar to the other annotated digital images. In yet another embodiment, one or more annotated digital images may be determined to be dissimilar to the other annotated images, yet relevant to a set of query terms. Accordingly, candidate lists generated from such dissimilar annotated digital images may be aggregated and presented to a user in a partitioned response.

Annotated digital images, once selected in step 120, will generally resemble one another. For example, if the request of step 110 identifies the keyword "rainbow," and five annotated digital images are selected in step 120, then the appearance of each of the five annotated digital images should generally depict a rainbow. Accordingly, the appearance of the five annotated digital images should resemble one another. As another example, each of annotated digital images 402, 404, and 406 depicted in FIG. 4 generally resemble each other.

However, certain keywords may result in the selection of annotated digital images that do not resemble each other. For example, consider a request that identifies the keyword "jaguar." Again, if five annotated digital images are selected in step 120, then perhaps four annotated digital images whose visual appearance resembles the animal named jaguar are selected in step 130, and another annotated digital image whose visual appearance resembles the car named jaguar is selected in step 130. Naturally, the visual appearance of the four annotated digital images whose visual appearance resembles the animal named jaguar will be similar to each other, but dissimilar to the appearance of the annotated digital image whose visual appearance resembles the car named jaguar. As a result, it may be desirable to determine that the annotated digital image whose visual appearance resembles the car named jaguar is not like the others, and as a result, remove the dissimilar annotated digital image, and any candidate digital images associated with it, from further consideration. In other embodiments, the dissimilar annotated image and any corresponding candidate digital images may be identified as dissimilar, yet relevant, to the set of query terms. In such a case, the dissimilar annotated image and any corresponding candidate images may still be included a subsequent response to the query.

One approach for determining whether annotated digital images are similar in appearance to each other operates under the assumption that if several annotated digital images are similar in appearance, then one would expect the set of candidate digital images associated with those annotated digital images to also be similar in appearance. Based on that rationale, this approach determines whether annotated digital images are similar in appearance to one another based on whether there is any overlap between digital images present in their associated set of candidate digital images. For example, if, in step 130, server 220 selects 10 candidate digital images for inclusion in a set of candidate digital images for each annotated digital image, and generally, there are about 4-6 overlapping candidate digital images in each set of candidate digital images, then if one annotated digital image does not have, in its set of candidate digital images, any overlapping candidate digital images that are also present in other candidate image sets, then one may assume that that annotated digital image is dissimilar in appearance to the other annotated digital images, and the dissimilar annotated digital image and the set of candidate digital images associated therewith are removed from further consideration such that the dissimilar images are excluded from search results.

Another approach for determining whether annotated digital images are similar in appearance to each other is to determine whether, for a first annotated digital image selected in step 120, the set of candidate digital images selected for the first annotated digital image in step 130 includes a second annotated digital image that was also selected in step 120. In other words, a determination is made as to whether a query by image search performed in step 130 on a first annotated digital image retrieved in step 120 retrieves a second annotated digital image retrieved in step 120. If so, then it is reasonable to assume that the first annotated digital image and the second annotated digital image have a similar appearance to each other.

Another approach for measuring the suitability of the annotated digital images selected in step 120 is to use a measure referred to as the "reciprocal rank." The reciprocal rank is defined as: "for a vector of results v, the reciprocal rank is 1/i, where i is the position of the first relevant result." Using this definition, the reciprocal rank for an annotated digital image selected in step 120 may be computed by using the other annotated digital images selected in step 120. The annotated digital images retrieved in step 120 are all assumed to be relevant to the results, without further manual intervention. In an embodiment, annotated digital images that have a low reciprocal rank are removed from the set of annotated digital image prior to proceeding to step 130. Various metrics may be used to determine the threshold for removing an annotated digital image from further consideration, e.g., by selecting the bottom k (where k is any integer up to the total number of annotated digital images) annotated digital images with the lowest reciprocal rank or to set a threshold on the value of the reciprocal rank directly. As an example of setting a threshold value for the reciprocal rank, any annotated digital image with a reciprocal rank less than or equal to ⅕ is removed from further consideration.

Another approach for measuring the suitability of the annotated digital images selected in step 120 is to use the "Spearman footrule distance" to compute the similarity between ranked lists. Given two ranked lists, $\sigma_1$ and $\sigma_2$, having at least one image in common, the Spearman footrule distance is defined as:

$$F(\sigma_1, \sigma_2) = \sum_{i=0}^{n} |\sigma_1(i) - \sigma_2(i)|$$

where $\sigma(i)$ is the rank position of image i. For example, two ranked candidate lists containing identical images, and identical image rankings, would produce a "distance" of zero. The greater the disparity in element rankings, the greater this distance. Thus, a list of candidate digital images may be deemed dissimilar to one or more other lists of candidate digital images where Spearman footrule distance is greater than a threshold distance, for example. Furthermore, the Spearman footrule distance can be extended to compute the similarity between a top k ranked list of candidate digital images and a top k aggregated list of annotated digital images (where k is an integer up to the total number of annotated digital images). This extension is referred to as the "induced Spearman footrule distance". However, in one embodiment, the ranked candidate list is first modified to contain only the elements which are also members of the ranked aggregated list, while preserving the original order. In an embodiment, ranked candidate lists which produce an induced Spearman footrule distance greater than a threshold distance are discarded such that the images therein are not considered for inclusion within final search results. In another embodiment, dissimilar candidate lists may be identified as dissimilar and returned as at least part of a response to a set of query terms.

As an example, for given a ranked aggregated list $\sigma_{agg} = \{i_3, i_2, i_5, i_4, i_4, i_7, i_{10}, i_{15}, i_{25}, i_8, i_{13}\}$ of digital images $i_n$, and ranked list of candidate digital images $\sigma_1 = \{i_1, i_4, i_2, i_9, i_{25}\}$, determining the induced Spearman footrule distance begins with modifying the ranked list $\sigma_1$ to only include the top k ranked elements (here using top 3 ranked elements as an example) which are also members of the ranked aggregated list $\sigma_{agg}$. Thus, the modified top 3 ranked list $\sigma_1$ comprises: $\{i_4, i_2, i_{25}\}$. Determining the distance between these lists requires application of the Spearman footrule equation listed above. The result of this calculation is a distance of 8 (|1−4|+|2−2|+|3−8|=8). Using this distance to measure the suitability of the annotated digital images associated with candidate list $\sigma_1$ may require determination of the induced Spearman footrule distance for one or more other candidate lists, or comparison with a threshold distance. For example, a ranked candidate list with an induced Spearman footrule distance of 8 may be determined to be greater than a predetermined threshold distance of 5. Thus, the annotated digital image and corresponding candidate digital images are discarded such that the images therein are not considered for inclusion within final search results.

After the sets of candidate digital images have been aggregated into a single set of digital images, a response to the request of step 110 is generated, as shall be explained in further detail below.

Generating a Response that Identifies Response Digital Images

In an embodiment, in step 150, a response that identifies one or more response digital images is generated by server 220. The one or more response digital images identified by the response are those digital images that are most responsive or relevant to the request of step 110. In certain embodiments, server 220 may then send the response from server 220 to client 210 over communications link 240.

In an embodiment, the one or more response digital images of step 150 may be selected by server 220 by selecting a certain number of the top ranked digital images in the single set of digital images of step 140. For example, as depicted in FIG. 4, server 220 may determine that digital images 480, 482, 484, 486, 488, 490, 492, 494, 496, and 498 are response digital images because these digital images are the top 10 ranked digital images in the single set of digital images 470. Choosing the top 10 ranked digital images is merely an example, as server 220 may choose any number of top ranked digital images, e.g., server 220 may choose the top 5 digital images from the single set of digital images 470 and determine that digital images 480, 482, 484, 486, and 488 are the response digital images.

Other metrics may be used to determine which digital images in the single set of digital images 470 qualify as response digital images. For example, any number of digital images which have a Borda count point total over a certain threshold may qualify as a response digital image in another embodiment.

In an embodiment, the response contains the one or more response digital images. Alternately, the response of step 150 may comprise information that (a) provides a link to the one or more response digital images or (b) describes the location where the one or more response digital images are stored.

In an embodiment, the response of step 150 may identify a set of one or more response digital images which are dissimilar to another set of one or more response digital images. For example, a request might identify the keyword "jaguar." Again, if five annotated digital images are selected in step 120, then perhaps four annotated digital images whose visual appearance resembles the animal named jaguar are selected in step 130, and another annotated digital image whose visual appearance resembles the car named jaguar is selected in step 130. Accordingly, server 220 may select the one or more response digital images of step 150 by selecting a certain number of the top ranked digital images whose visual appearance resembles the animal named jaguar. In addition to these selected images, server 220 may also select the top ranked digital images whose visual appearance resembles the car named jaguar.

In an embodiment, a response containing a set of one or more response digital which is dissimilar to another set of one or more response digital images may be partitioned to distinguish each categorical set of response digital images. Partitioning a response may be particularly useful when the context of a set of query terms is unknown. In such a situation, returning a partitioned response containing similar and dissimilar response digital images may be useful in returning all potentially relevant response digital images in a coherent manner.

Figure 7:
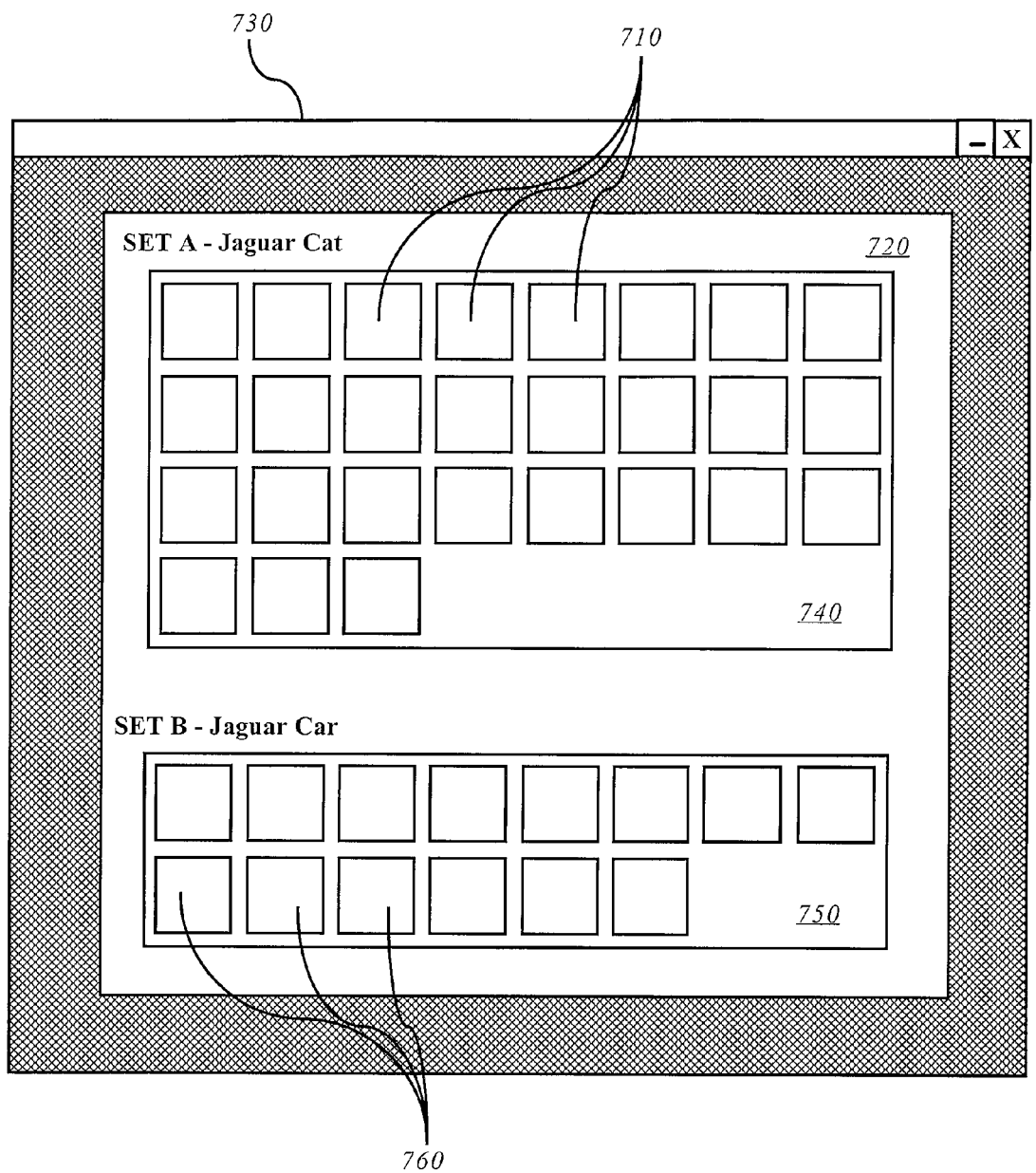
FIG. 7 is an illustration of a partitioned response to a set of query terms according to an embodiment of the invention.

For example, FIG. 7 is an illustration depicting a partitioned response 720 containing two sets of digital images 740 and 750. Sets 740 and 750 are dissimilar to each other in that they reflect different "senses" of a query term. Continuing the previous example in which a "jaguar" keyword was used to select annotated digital images, the partitioned response 720 contains a first set of digital images 740 resembling the animal named jaguar. The partitioned response also contains a second set of digital images 750 resembling the car named jaguar. The partitioned response 720 may be returned to a client web browser 730, for example. In other embodiments, a partitioned response 720 may contain more than two sets of dissimilar digital images.

Generating a Candidate List Based on Composite Data

In an embodiment, it is advantageous to construct a single list of candidate digital images from composite data. Generating lists of candidate digital images, as previously discussed, may be computationally expensive due to the number of image comparisons required to produce a diverse set of response digital images. As an example, a set of query terms producing four annotated digital images would require generation of four lists of candidate digital images, and at least one image comparison per candidate digital image. Using a virtual annotated image comprised of composite data, however, may be four times as fast, as only one list of candidate digital images (i.e., those that are similar to the virtual annotated image) is generated.

Figure 5:
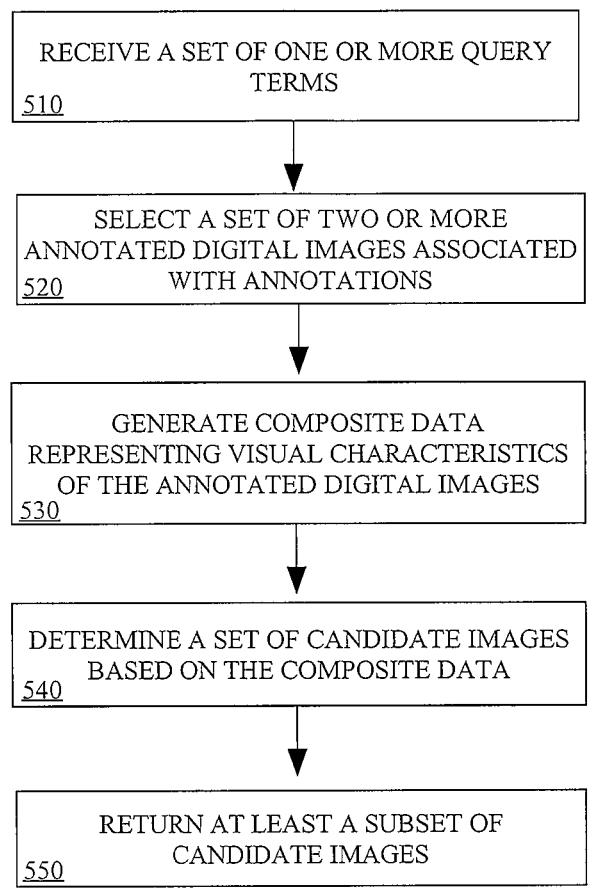
FIG. 5 is a flowchart depicting the high level functional steps of performing a search according to an embodiment of the invention.

FIG. 5 is a flowchart depicting the high level functional steps of performing a search using a virtual annotated digital image. In step 510, a set of one or more query terms is received. As discussed previously, a server 220 may be configured to receive and respond to a query. In step 520, a set of two or more digital images are selected based on annotations associated with the digital images. Composite data which represents visual characteristics of each annotated digital image is generated in step 530. In an embodiment, composite data is comprised of the common visual characteristics, or visual "points of interest", within the annotated digital images. In step 540, the composite data is compared with a set, or corpus, of digital images. Digital images which are determined to be sufficiently similar (e.g., by having at least a specified quantity of visual features on common with) to the composite data are added to a list of candidate digital images.

Finally, in step 550, at least a subset of the candidate digital images are returned as a response to the set of query terms received in step 510.

Figure 6:
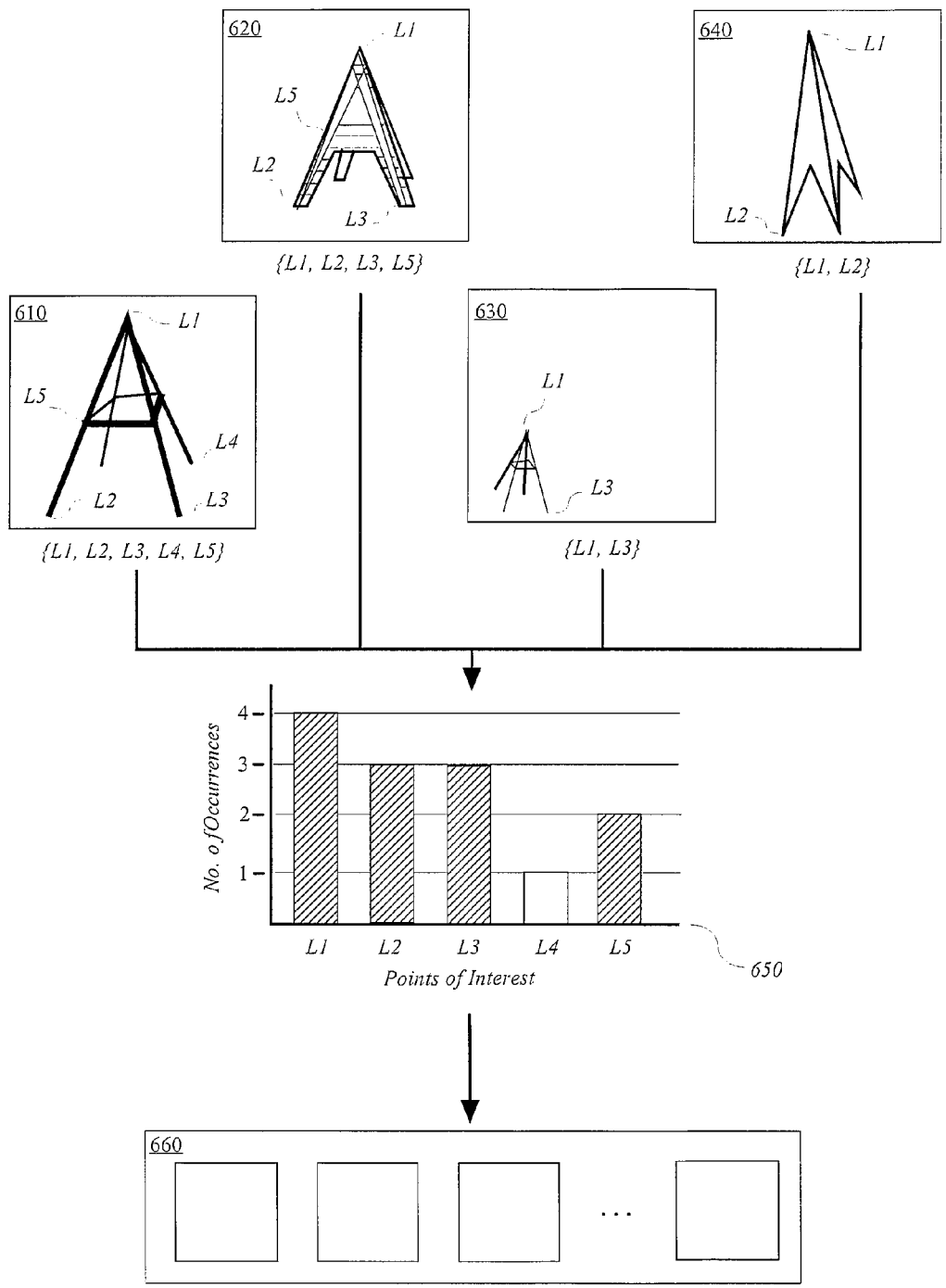
FIG. 6 is an illustration depicting the identification of candidate digital images according to an embodiment of the invention.

In an embodiment, composite data of at least two annotated digital images is generated from the points of interest common to a set of annotated digital images. For example, referring to FIG. 6, a query containing the terms "Eiffel" and "Tower" results in the initial selection of four annotated digital images 610, 620, 630, and 640, each tagged with at least one of the query terms. Composite data 650 is derived from the points of interest L1, L2, L3, L4, and L5 found within the set of annotated digital images 610, 620, 630, and 640. Various methods of determining points of interest within a digital image, such as edge detection algorithms, are well known in the art, and may be used to generate such composite data 650. For simplicity, FIG. 6 depicts the composite data 650 as a histogram containing five points of interest, L1-L5, and their corresponding total number of occurrences. In an embodiment, the composite data 650 may be an array or vector identifying the total number of occurrences of each point of interest found within the annotated digital images 610, 620, and 630.

In an embodiment, the composite data 650 may be pruned, or filtered, to remove points of interest which have a total number of occurrences that is less than a threshold number of occurrences. The threshold number of occurrences may be set to a value less than the number of annotated digital images to remove points of interest which are clearly not common to all annotated digital images. Considering FIG. 6, point of interest L4 only occurs once over the set of annotated digital images 610, 620, 630, and 640. Thus, point of interest L4 may be deemed insignificant and removed from the composite data 650. In other embodiments, the threshold value may vary depending on the number of common points of interest, or occurrences thereof, found within the set of annotated digital images.

After the composite data 650 is generated, the composite data 650 is compared to a collection of digital images to produce a candidate list of digital images 660. In one embodiment, cosine similarity is used to compute the similarity between a digital image in the collection of digital images and the composite data 650. For example, based on an edge detection algorithm, a digital image in a collection of digital images contains a number of points of interest. The points of interest found within the digital image, and their corresponding number of occurrences, may be stored in a vector much like the composite data 650. If the cosine of the angle between the composite data 650 and digital image vector is found to be greater than a threshold value, then the digital image is added to the list of candidate digital images 660.

In an embodiment, query response time may be improved by generating composite data 650 for a set of query terms prior to query time. For example, a set of popular or common query terms may be used to generate preprocessed composite data. The preprocessed composite data 650 is associated with the set of popular query terms. When a subsequent query containing the set of popular terms is received by a server 220, for example, the query is directly mapped to the preprocessed composite data 650. Mapping a query to preprocessed composite data 650 removes any processing time associated with selecting annotated digital images and collecting composite data. A candidate list of digital images, and a set of corresponding response digital images, is generated by iterating over the set of digital images and comparing each such image with the preprocessed composite data 650, as discussed previously.

Determining an Optimum Quantity of Annotated Digital Images

In determining how many annotated digital images server 220 should identify in step 120, there may be tradeoffs between accuracy and speed. The more annotated digital images identified by server 220 in step 120, the more accurate the results may eventually be, but the processing time required to obtain those results increases. As a result, in an embodiment, the particular number of annotated digital images identified by server 220 in step 120 is chosen based upon a cost-benefit analysis of identifying different numbers of annotated digital images.

Figure 8:
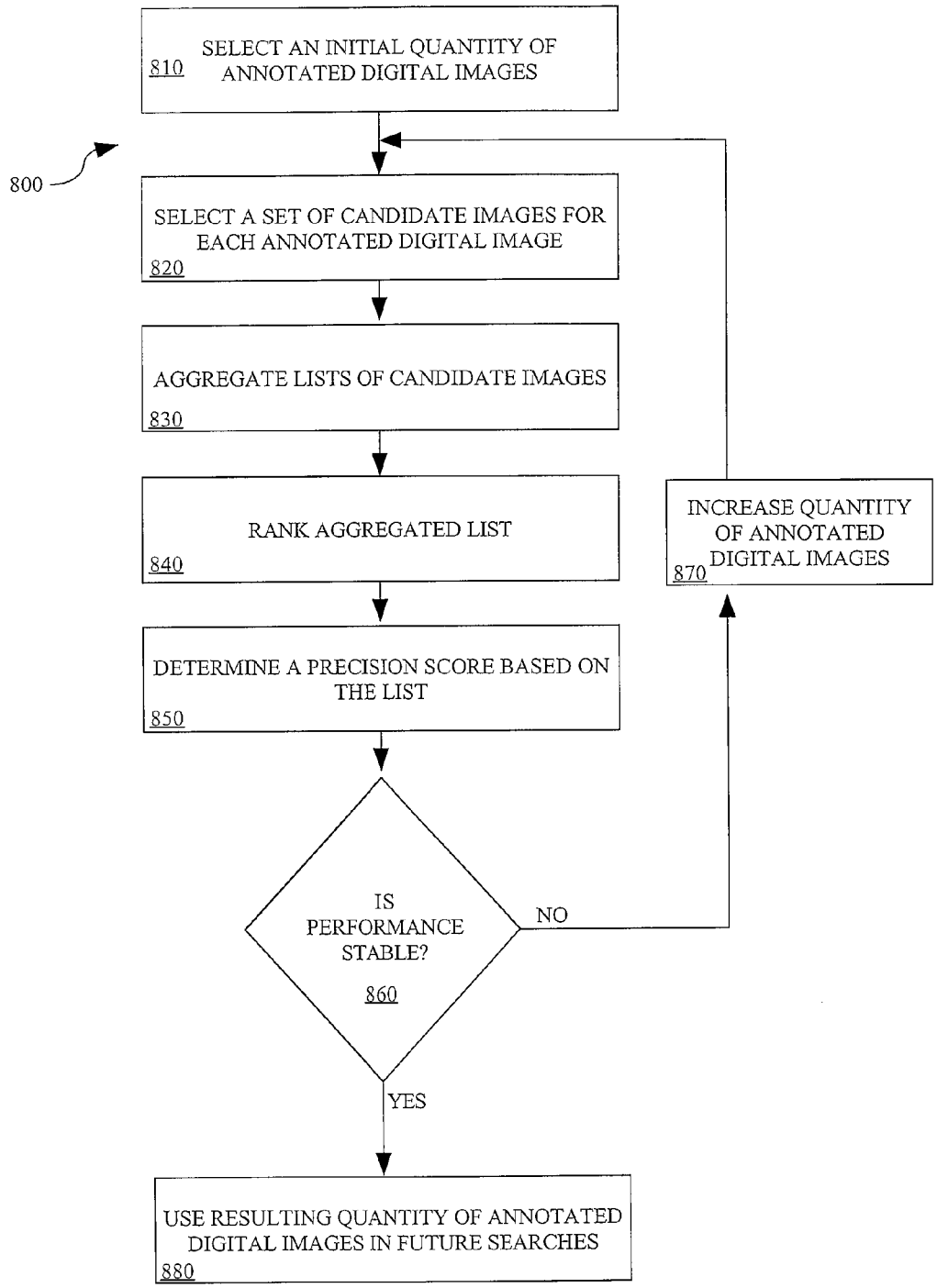
FIG. 8 is a flowchart depicting the high level functional steps of determining an optimum quantity of annotated digital images according to an embodiment of the invention.

In an embodiment, an optimum number of annotated digital images is empirically determined. One method of empirically determining an optimal quantity of annotated digital images generally comprises evaluating the relevance of the top "n" annotated digital images in a ranked list of digital images (where "n" is a specified quantity), and increasing the number of annotated digital images until performance is stable. For example, FIG. 8 is a flowchart of a method 800 depicting the high level functional steps of empirically determining an optimum quantity of annotated digital images for use in selecting sets of candidate images or for use in generating composite data. In step 810, an initial quantity of annotated digital images is selected. In step 820, a candidate list of digital images is selected for each annotated digital image. Each candidate list of digital images is aggregated in step 830, and ranked in step 840. In one embodiment, the aggregated list produced in step 830 is ranked according to relevance with respect to a set of query terms. For example, a low rank is assigned to images that are associated with annotations that contain terms that are identical or substantially similar to the set of query terms (e.g., rank "1" assigned to image with annotation "jaguar," where the set of query terms is "jaguar"). However, other embodiments may implement other ranking schemes such as a reciprocal rank as discussed herein.

In step 850, a precision score is determined for the current quantity of annotated digital images selected in step 810. In one embodiment, a precision score is based on the number of relevant digital images in a ranked aggregated set of digital images. As an example, for a given quantity of annotated digital images, the precision score is the number of relevant digital images in the aggregated set divided by the total number of top "n" images in an aggregated set of digital images.

In step 860, a determination is made as to whether the current quantity of annotated digital images produces stable performance. In an embodiment, determination of stability is based on multiple factors, such as the current precision score, one or more previously determined precision scores, and variance. One indication of stable performance may be realization of substantially similar, or identical, precision scores across multiple iterations of method 800. An optimum quantity of annotated digital images may be found where the difference between precision scores becomes insignificant or drops below a threshold value. It may be advantageous to use the minimum quantity of annotated digital images associated with a stable performance to minimize image comparisons in future searches.

One indication of unstable performance may be a large variation between a current precision score, and one or more previously determined precision scores. If performance is considered unstable in step 860 then the current number of annotated digital images is increased in step 870. Control is then passed back to step 820 to determine a new precision score based on the increased number of annotated digital images.

If performance is considered stable in step 860, then the resulting quantity of annotated digital images may be saved. Finally, in step 880, the resulting, or optimum, quantity of annotated digital images is used with respect to future searches. It may be advantageous to perform the steps of method 800 on a periodic basis, as the determination of an optimum quantity is based, in part, on the contents of the digital image corpus. For example, the steps of method 800 may be repeated whenever digital images are added or removed from the corpus of digital images to ensure that the optimum quantity reflects the particular characteristics of the current corpus.

Figure 9:
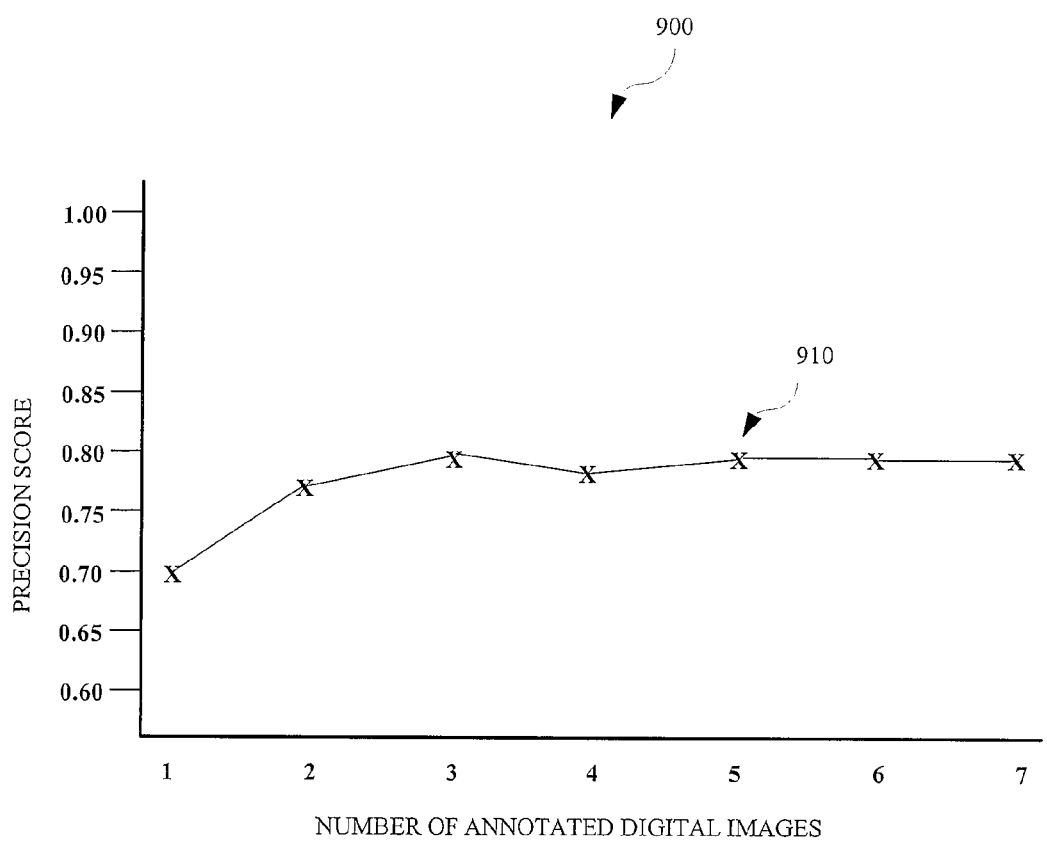
FIG. 9 is a graph of precision score vs. number of digital images according to one embodiment of the invention.

FIG. 9 is a visual representation of performance with respect to an increasing quantity of annotated digital images. It should be understood that FIG. 9 is only an example of data produced from one implementation of method 800. As shown, the precision score varies between 0.70 and 0.80 when using 1-5 annotated digital images (where precision score is the number of relevant digital images divided by the total number of top "n" images in an aggregated set). However, when using five, six, and seven annotated digital images, the precision score seems to stabilize, or converge, at 0.80. As previously noted, selecting the absolute minimum quantity of annotated images associated with stable performance minimizes the number of image comparisons required for subsequent searches. Thus, as shown in FIG. 9, five annotated digital images is considered the optimum quantity for future searches because it is the minimum quantity at stable performance (0.80).

In another embodiment, an optimum quantity of annotated digital images also depends on the type and/or number of terms in a set of query terms. For example, the steps of method 800 may be repeated to determine an optimum number of annotated digital images for every known set of popular query terms. Thus, an optimum quantity of annotated digital images determined for a set of three query terms (e.g., "Eiffel Tower paris") may differ from an optimum quantity of annotated digital images determined for a set of six query terms (e.g., "small TCP/IP stack for 8-bit architectures").

Advantageously, embodiments of the invention are able process keyword-based requests for digital images more accurately than prior approaches. Further, embodiments of the invention are able to process keyword-based requests for digital images than prior approaches in less time than prior approaches. The techniques discussed herein may be adapted for use in a variety of contexts. For example, embodiments of the invention may be employed over the Internet as well as locally on a single machine.

Implementing Mechanisms

Figure 10:
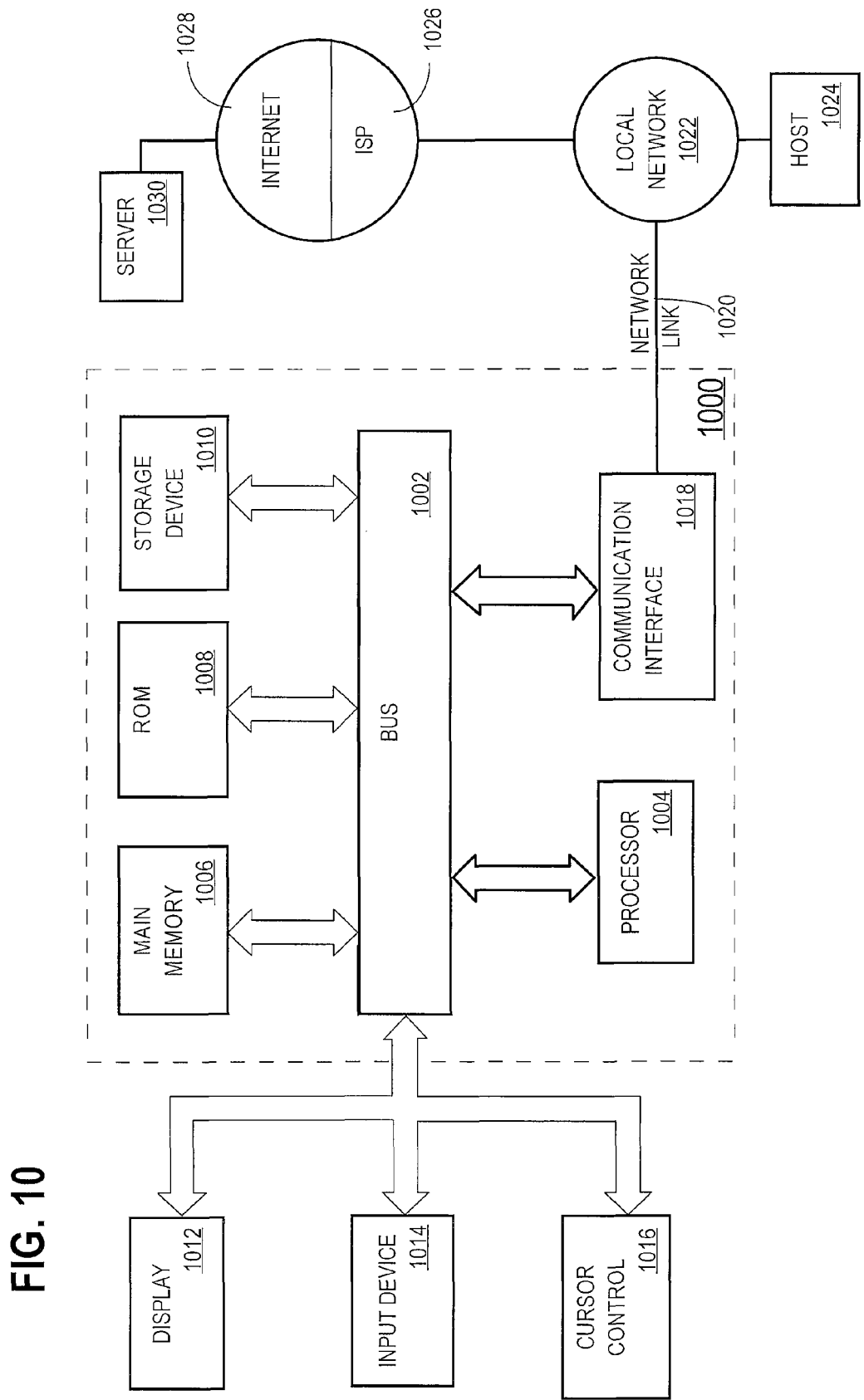
FIG. 10 is an illustration of a computer system according to one embodiment of the invention.

In an embodiment, each of client 210, server 220, and storage 230 may be implemented using a computer system. FIG. 10 is a block diagram that illustrates a computer system 1000 upon which an embodiment of the invention, or a component thereof, may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 502 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 510 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 504 as it is received, and/or stored in storage device 1010, or other non-volatile storage for later execution. In this manner, computer system 1000 may obtain application code in the form of a carrier wave.

The digital images included in the drawings of this document were downloaded from Flickr and were posted by cindy47452, SolGrundy, wallyg, Atelier Teee, Bludegeoner86, ivanx, matsuyuki, borkurdotnet, dan.blanachard, riebschlager, Ctd 2005, engelcox, triciaward, Essjay in NZ, Anushruti R, p!o, navonod, davesag, Zeetz Jones, marymactavish, selva, Blacknell, Wysx, Hearlover1717,el_en_houston, nutmeg66, kaneda99, foreversouls, xolivare,alexi1982, Fleur-Design,bolti22,tricaward, John Gevers, powerbooktrance, Steve Rhodes, Neil101, theparadigmshifter, larsomat, mundocuadro, xgravity23, Heavenbound, neiljmh, gspidermac.net, morebouncetotheounce,jthorstad, flex, richevenhouse, Jesman, Felix63, Platform 3, and Mickeleh Creative Commons (CC) license.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
receiving a query, wherein the query identifies a set of one or more query terms;
in response to receiving the query that identifies the set of one or more query terms, performing the steps of:
selecting, from an image corpus, a set of three or more sample images that are associated with annotations that match one or more of the query terms;
producing multiple separate sets of candidate images by selecting from the image corpus, for each particular sample image in the set of sample images, a separate set of candidate images that are visually similar to that particular sample image;
from among images that belong to the multiple separate sets of candidate images, determining a set of duplicate images;
wherein each image in the set of duplicate images is a member of at least two of the multiple separate sets of candidate images; and
generating a response to the query, wherein the response is based, at least in part, on the set of duplicate images;
wherein the steps are performed by at least one computing device.

2. The method of claim 1, wherein the multiple separate sets of candidate images include a first set of candidate images, a second set of candidate images, and a third set of candidate images, and wherein:
the step of determining the set of duplicate images comprises:
determining that the first set of candidate images and the second set of candidate images both contain at least a threshold number of candidate images in common;
determining that the third set of candidate images contains less than the threshold number of candidate images in common with the first and second sets of candidate images; and
the method further comprises, in response to determining that the third set of candidate images contains less than the threshold number of candidate images in common with the first and second sets of candidate images, generating an aggregated set of images based on the first and second sets of candidate images;
wherein the response includes at least a subset of the images in the aggregated set of images.

3. The method of claim 2, further comprising associating a rank with each image contained in the first, second, and third sets of candidate images, wherein the determination that the third set of candidate images contain less than the threshold number of candidate images in common with the first and second sets of candidate images is based, at least in part, on the rank.

4. The method of claim 2, wherein the aggregated set of images is generated based on the first, second, and third sets of candidate images, and wherein the response is a partitioned response to the query, wherein the partitioned response identifies the third set of candidate images as distinguishable from the first and second sets of candidate images.

5. A non-transitory computer-readable medium storing one or more sequences of instructions, wherein processing of the one or more sequences of instructions by one or more processors causes performance of the method recited in claim 1.

6. A non-transitory computer-readable medium storing one or more sequences of instructions, wherein processing of the one or more sequences of instructions by one or more processors causes performance of the method recited in claim 2.

7. A computer-implemented method comprising steps of:
receiving a set of one or more query terms;
selecting, from an image corpus, a set of sample images that are associated with annotations that match one or more of the query terms;
based on the sample images in the set of sample images, generating composite data that represents at least one duplicate visual characteristic;
wherein the at least one duplicate visual characteristic is a visual characteristic that is possessed by multiple sample images in the set of sample images;
determining a set of candidate images that possess visual characteristics that are similar to the at least one visual characteristic represented by the composite data; and
returning at least a subset of candidate images, from the set of candidate images, as results of a query that contained the set of query terms;
wherein the steps are performed by at least one computing device.

8. The method of claim 7, wherein the results are generated without determining whether any image in the image corpus is visually similar to any one of the sample images in the set of sample images.

9. The method of claim 7, wherein a number of sample images in the set of sample images to be selected is determined prior to receiving the set of one or more query terms.

10. The method of claim 7, wherein generating composite data further comprises associating the at least one visual characteristic with a value, wherein the value represents a number of occurrences of the at least one visual characteristic within the set of sample images.

11. The method of claim 10, wherein the method further comprises storing the composite data in association with the set of one or more query terms.

12. The method of claim 10, further comprising: filtering the composite data to remove at least one visual characteristic associated with a value less which is less than a threshold value.

13. A non-transitory computer-readable medium storing one or more sequences of instructions, wherein processing of the one or more sequences of instructions by one or more processors causes performance of the method recited in claim 7.

14. A non-transitory computer-readable medium storing one or more sequences of instructions, wherein processing of the one or more sequences of instructions by one or more processors causes performance of the method recited in claim 9.

15. A computer-implemented method comprising steps of:
for each particular sample image of a first set of sample images, selecting, from an image corpus, a separate set of candidate images that are visually similar to that particular sample image, thereby producing a first plurality of sets of candidate images;
aggregating the first plurality of sets of candidate images to produce a first aggregated list of images;
determining a first precision score that is based on a measure of relevance of images in the first aggregated list of images to a specified set of query terms;
for each particular sample image of a second set of sample images, selecting, from the image corpus, a separate set of candidate images that are visually similar to that particular sample image, thereby producing a second plurality of sets of candidate images;
aggregating the second plurality of sets of candidate images to produce a second aggregated list of images;
determining a second precision score that is based on a measure of relevance of images in the second aggregated list of images to the specified set of query terms;
wherein a quantity of sample images in the second set of sample images is greater than a quantity of sample images in the first set of sample images; and
based at least in part on the first precision score and the second precision score, determining a quantity of sample images to be used in performing future searches for images in the image corpus;
wherein the steps are performed by at least one computing device.

16. The method of claim 15, wherein the measure of relevance is based, at least in part, on dividing a quantity of relevant images in a set of images by a quantity of at least a subset of images in a set of images.

17. The method of claim 15, wherein the method further comprises:
prior to determining the first and second precision scores, ranking the first and second aggregated list of images to produce a first and second ranked list of images, wherein each measure of relevance for the first and second precision scores is based on each respective first and second ranked list of images.

18. The method of claim 15, wherein the quantity of sample images to be used in performing future searches is selected based, at least in part, on determining whether a difference value between the first precision score and the second precision score is below a threshold difference value.

19. A non-transitory computer-readable medium storing one or more sequences of instructions, wherein processing of the one or more sequences of instructions by one or more processors causes performance of the method recited in claim 15.

20. A non-transitory computer-readable medium storing one or more sequences of instructions, wherein processing of the one or more sequences of instructions by one or more processors causes performance of the method recited in claim 16.

* * * * *